(12) United States Patent
Barrow-Williams et al.

(10) Patent No.: US 10,169,091 B2
(45) Date of Patent: Jan. 1, 2019

(54) EFFICIENT MEMORY VIRTUALIZATION IN MULTI-THREADED PROCESSING UNITS

(71) Applicant: NVIDIA Corporation, Santa Clara, CA (US)

(72) Inventors: Nick Barrow-Williams, San Francisco, CA (US); Brian Fahs, Los Altos, CA (US); Jerome F. Duluk, Jr., Palo Alto, CA (US); James Leroy Deming, Madison, AL (US); Timothy John Purcell, Provo, UT (US); Lucien Dunning, Santa Clara, CA (US); Mark Hairgrove, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 142 days.

(21) Appl. No.: 13/660,799

(22) Filed: Oct. 25, 2012

(65) Prior Publication Data
US 2014/0123146 A1 May 1, 2014

(51) Int. Cl.
*G06F 9/46* (2006.01)
*G06F 15/173* (2006.01)
(Continued)

(52) U.S. Cl.
CPC ............ *G06F 9/5033* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 9/48; G06F 9/4881;
(Continued)

(56) References Cited

U.S. PATENT DOCUMENTS 5,349,656 A * 9/1994 Kaneko ................. G06F 9/4881
718/102
7,409,487 B1 8/2008 Chen et al.
(Continued)

FOREIGN PATENT DOCUMENTS

CN 1993683 A 7/2007
CN 102317912 A1 1/2012
(Continued)

OTHER PUBLICATIONS

U.S. Office Action dated Mar. 18, 2015, for U.S. Appl. No. 13/660,815.
(Continued)

*Primary Examiner* — Charles M Swift
(74) *Attorney, Agent, or Firm* — Artegis Law Group, LLP

(57) ABSTRACT

A technique for simultaneously executing multiple tasks, each having an independent virtual address space, involves assigning an address space identifier (ASID) to each task and constructing each virtual memory access request to include both a virtual address and the ASID. During virtual to physical address translation, the ASID selects a corresponding page table, which includes virtual to physical address mappings for the ASID and associated task. Entries for a translation look-aside buffer (TLB) include both the virtual address and ASID to complete each mapping to a physical address. Deep scheduling of tasks sharing a virtual address space may be implemented to improve cache affinity for both TLB and data caches.

22 Claims, 13 Drawing Sheets

(51) Int. Cl.
*G06F 9/50* (2006.01)
*G06F 12/1045* (2016.01)
*G06F 9/48* (2006.01)
*G06F 9/455* (2018.01)
*G06F 12/109* (2016.01)
*G06F 12/1036* (2016.01)

(52) U.S. Cl.
CPC .......... *G06F 9/45558* (2013.01); *G06F 9/48* (2013.01); *G06F 9/4881* (2013.01); *G06F 9/50* (2013.01); *G06F 9/5005* (2013.01); *G06F 9/505* (2013.01); *G06F 9/5027* (2013.01); *G06F 9/5038* (2013.01); *G06F 9/5044* (2013.01); *G06F 12/109* (2013.01); *G06F 12/1045* (2013.01); *G06F 12/1036* (2013.01)

(58) Field of Classification Search
CPC ........ G06F 9/50; G06F 9/5005; G06F 9/5027; G06F 9/50233; G06F 9/5038; G06F 9/5044; G06F 9/505
See application file for complete search history.

(56) References Cited

U.S. PATENT DOCUMENTS

| | | | |
|---|---|---|---|
| 2001/0052053 A1* | 12/2001 | Nemirovsky | G06F 9/546 711/138 |
| 2003/0018691 A1* | 1/2003 | Bono | 709/106 |
| 2003/0135711 A1 | 7/2003 | Shoemaker et al. | |
| 2004/0068730 A1* | 4/2004 | Miller et al. | 718/106 |
| 2004/0199919 A1* | 10/2004 | Tovinkere | 718/102 |
| 2004/0267916 A1* | 12/2004 | Chambliss | H04L 41/0893 709/223 |
| 2005/0108713 A1* | 5/2005 | Geye et al. | 718/100 |
| 2005/0108714 A1* | 5/2005 | Geye et al. | 718/100 |
| 2005/0108717 A1* | 5/2005 | Hong et al. | 718/102 |
| 2005/0210472 A1* | 9/2005 | Accapadi | G06F 9/505 718/105 |
| 2006/0037017 A1* | 2/2006 | Accapadi et al. | 718/100 |
| 2006/0179156 A1* | 8/2006 | Eatherton et al. | 709/238 |
| 2006/0190945 A1* | 8/2006 | Kissell | 718/108 |
| 2006/0206686 A1* | 9/2006 | Banerjee | G06F 12/1027 711/205 |
| 2006/0288346 A1* | 12/2006 | Santos et al. | 718/102 |
| 2007/0039002 A1* | 2/2007 | McDonald | 718/102 |
| 2008/0172668 A1* | 7/2008 | Tzruya | 718/101 |
| 2009/0165007 A1* | 6/2009 | Aghajanyan | 718/103 |
| 2009/0187915 A1* | 7/2009 | Chew et al. | 718/104 |
| 2009/0193222 A1 | 7/2009 | Brandt et al. | |
| 2009/0210649 A1* | 8/2009 | Wan et al. | 711/170 |
| 2009/0254319 A1 | 10/2009 | Nieveler et al. | |
| 2010/0017804 A1* | 1/2010 | Gupta | G06F 9/5033 718/102 |
| 2010/0106936 A1* | 4/2010 | Doi | G06F 12/1027 711/205 |
| 2010/0064291 A1 | 5/2010 | Aila et al. | |
| 2010/0257538 A1* | 10/2010 | Zhao et al. | 718/106 |
| 2010/0287356 A1* | 11/2010 | Cameron | G06F 12/1027 711/207 |
| 2011/0035751 A1* | 2/2011 | Krishnakumar | G06F 9/4881 718/103 |
| 2011/0088038 A1* | 4/2011 | Kruglick | 718/104 |
| 2011/0107340 A1* | 5/2011 | Gupta | G06F 9/4881 718/102 |
| 2011/0125952 A1* | 5/2011 | Brandt | G06F 9/4843 711/6 |
| 2011/0231630 A1 | 9/2011 | Dannowski et al. | |
| 2011/0276978 A1* | 11/2011 | Gaiarsa | G06F 9/46 718/104 |
| 2011/0302585 A1* | 12/2011 | Dice | G06F 9/5033 718/102 |
| 2012/0008674 A1* | 1/2012 | Yamamoto et al. | 375/240.01 |
| 2012/0072908 A1* | 3/2012 | Schroth | G06F 9/5033 718/1 |
| 2012/0173843 A1* | 7/2012 | Kamdar | G06F 12/1027 711/207 |
| 2012/0284732 A1* | 11/2012 | Griglock | G06F 9/5066 718/104 |
| 2013/0097360 A1* | 4/2013 | Brandt | G06F 9/4843 711/6 |
| 2013/0262816 A1* | 10/2013 | Ronen | G06F 12/1027 711/207 |

FOREIGN PATENT DOCUMENTS

| | | |
|---|---|---|
| TW | 200403565 A | 3/2004 |
| TW | 200532473 A | 10/2005 |

OTHER PUBLICATIONS

U.S. Office Action dated Feb. 12, 2015, for U.S. Appl. No. 13/660,763.

\* cited by examiner

EFFICIENT MEMORY VIRTUALIZATION IN MULTI-THREADED PROCESSING UNITS

BACKGROUND OF THE INVENTION

Field of the Invention

The present invention generally relates to multi-threaded computer architectures and, more specifically, to efficient memory virtualization in multi-threaded processing units.

Description of the Related Art

In conventional computing systems having both a central processing unit (CPU) and a graphics processing unit (GPU), the CPU and performs a portion of application computations, allocates resources, and manages overall application execution, while the GPU performs high-throughput computations determined by the CPU. In certain application spaces, such as high performance computing (HPC) applications, the GPU typically performs a majority of computations associated with a given application. As a consequence, overall application performance is directly related to GPU utilization. In such applications, high application performance is achieved with high GPU utilization, a condition characterized by a relatively large portion of GPU processing units concurrently executing useful work. The work is organized into thread programs, which execute in parallel on processing units.

A typical thread program executes as highly parallel, highly similar operations across a parallel dataset, such as an image or set of images, residing within a single virtual address space. If an application needs to execute multiple, different thread programs, then the GPU conventionally executes one of the different thread programs at a time, each within a corresponding virtual address space, until the different thread programs have all completed their assigned work. Each thread program is loaded into a corresponding context for execution within the GPU. The context includes virtual address space state that is loaded into page tables residing within the GPU. Because each different thread program conventionally requires a private virtual address space, only one thread program may execute on the GPU at any one time.

HPC applications are typically executed on an HPC cluster, which conventionally includes a set of nodes, each comprising a CPU and a GPU. Each node is typically assigned a set of tasks that may communicate with other tasks executing on other nodes via a message passing interface (MPI) task. A typical GPU computation task executes efficiently with high GPU utilization as set of parallel thread program instances within a common virtual memory space. However, given conventional GPU execution models, only one MPI task may execute on a given GPU at a time. Each MPI task may comprise a range of workloads for the GPU, giving rise to a corresponding range of GPU utilization. In one scenario, only one thread or a small number of threads is executed on the GPU as an MPI task, resulting in poor GPU utilization and poor overall application performance. As a consequence, certain HPC applications perform inefficiently on GPU-based HPC processing clusters. In general, applications that require the GPU to sequentially execute tasks comprising a small number of thread instances that each requires an independent virtual address space will perform poorly.

As the foregoing illustrates, what is needed in the art is a technique that enables concurrent GPU execution of tasks having different virtual address spaces.

SUMMARY OF THE INVENTION

One embodiment of the present invention sets forth a method for concurrently executing two or more thread programs that have different virtual address spaces on a parallel processing subsystem, the method comprising retrieving a set of task metadata that includes a first page lookup table associated with a first virtual address space identified by a first address space identifier (ASID), and a second page lookup table associated with a second virtual address space identified by a second ASID, scheduling a first thread program that is associated with the first virtual address space to execute within a first processing core of the parallel processing subsystem, and scheduling a second thread program that is associated with the second virtual address space to execute within the first processing core or another processing core of the parallel processing subsystem, wherein virtual address requests generated by the first thread program when executing include the first ASID, and virtual address requests generated by the second thread program include the second ASID.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the present invention is that a GPU may simultaneously execute different tasks having different virtual address spaces, thereby improving GPU utilization and performance in certain applications. Another advantage of the present invention is that GPU tasks are able to execute with address space isolation, thereby improving reliability and reducing development effort associated with debugging.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
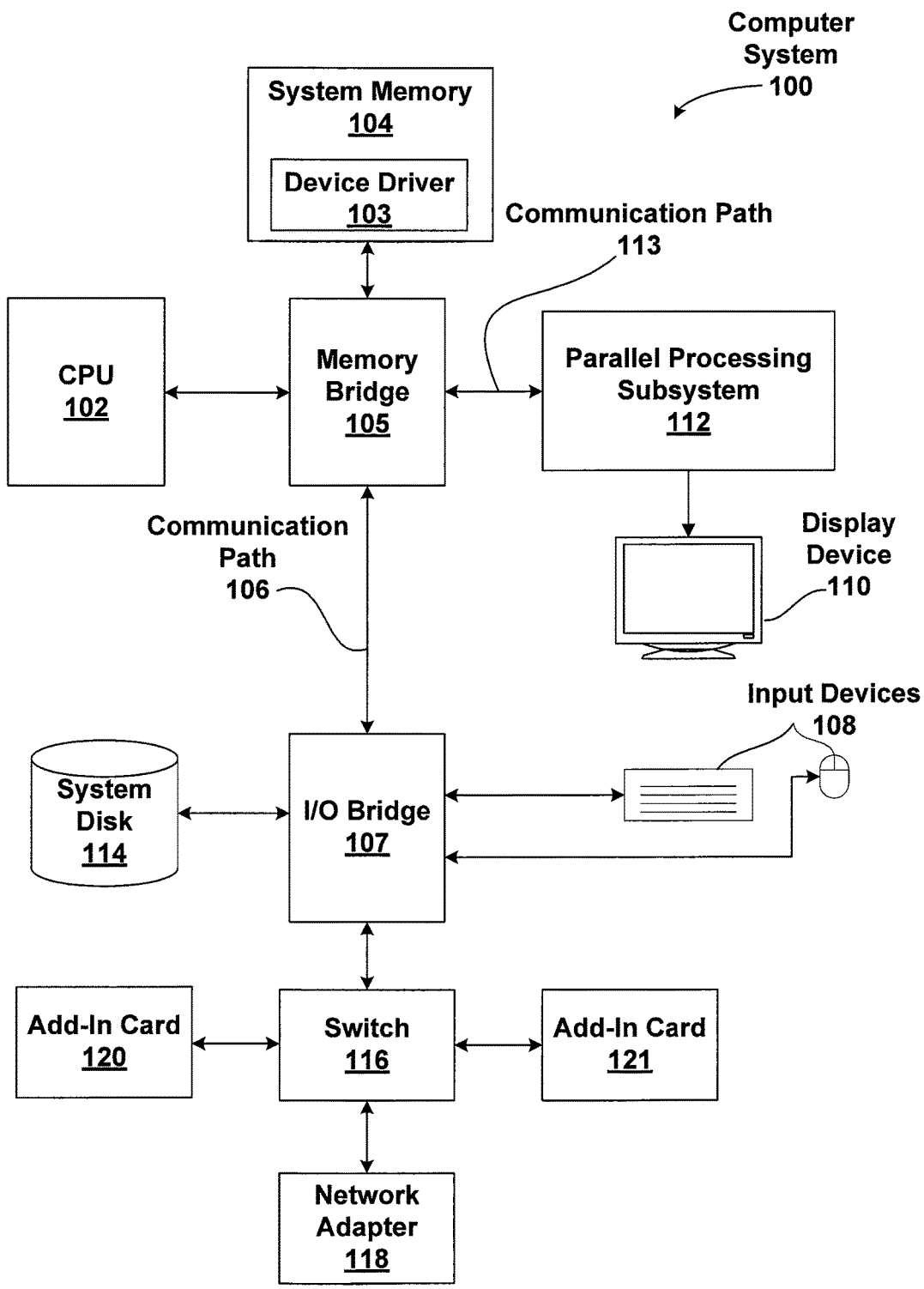
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
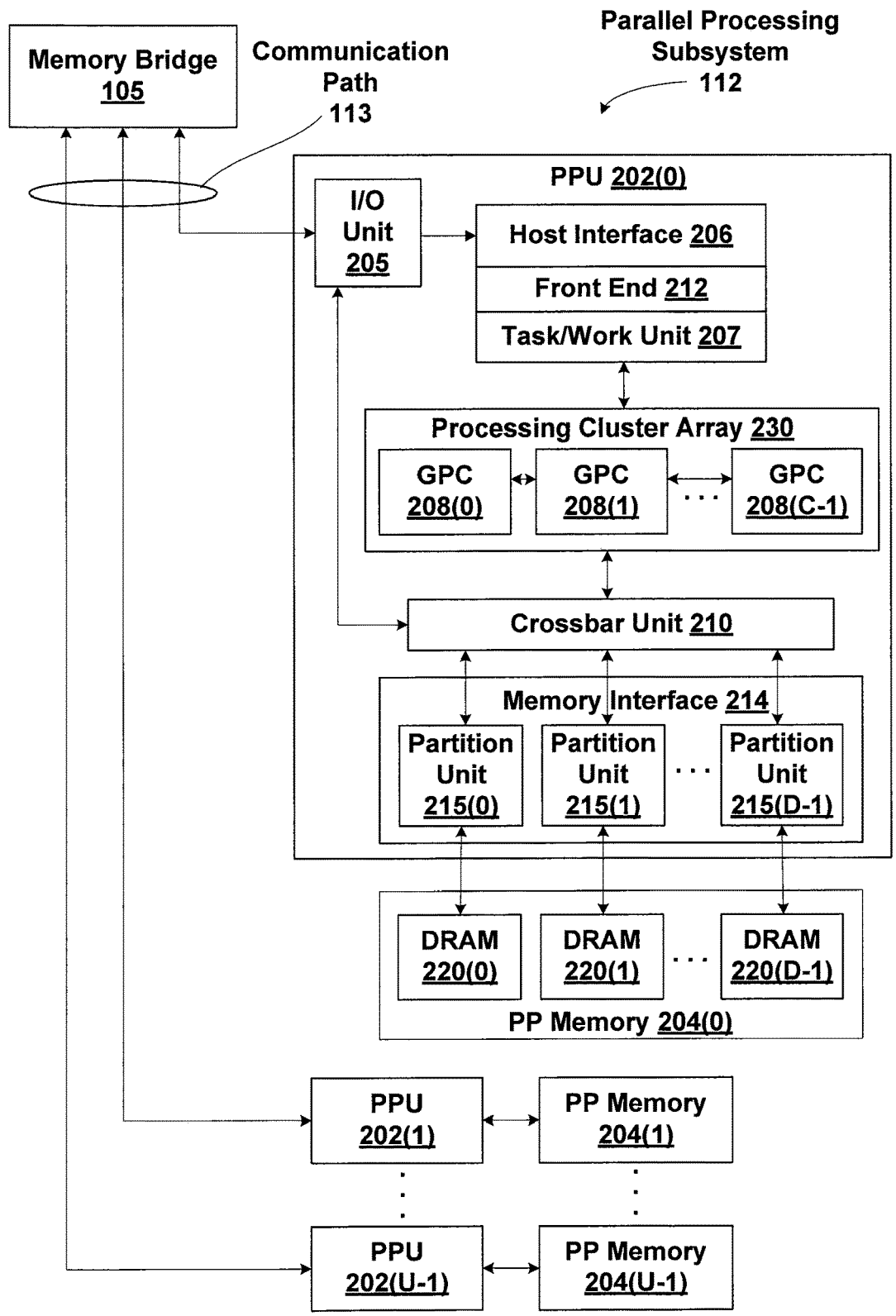
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where $D \geq 1$. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
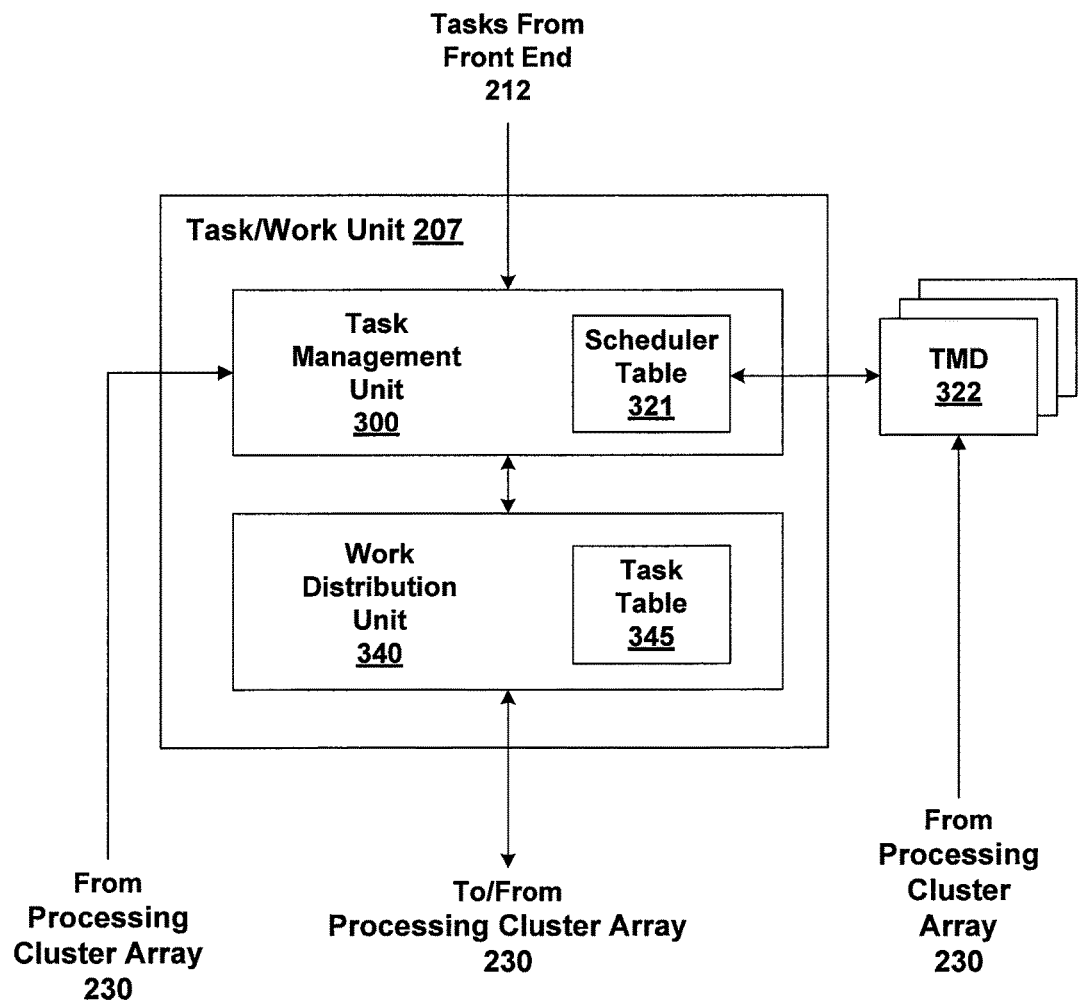
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
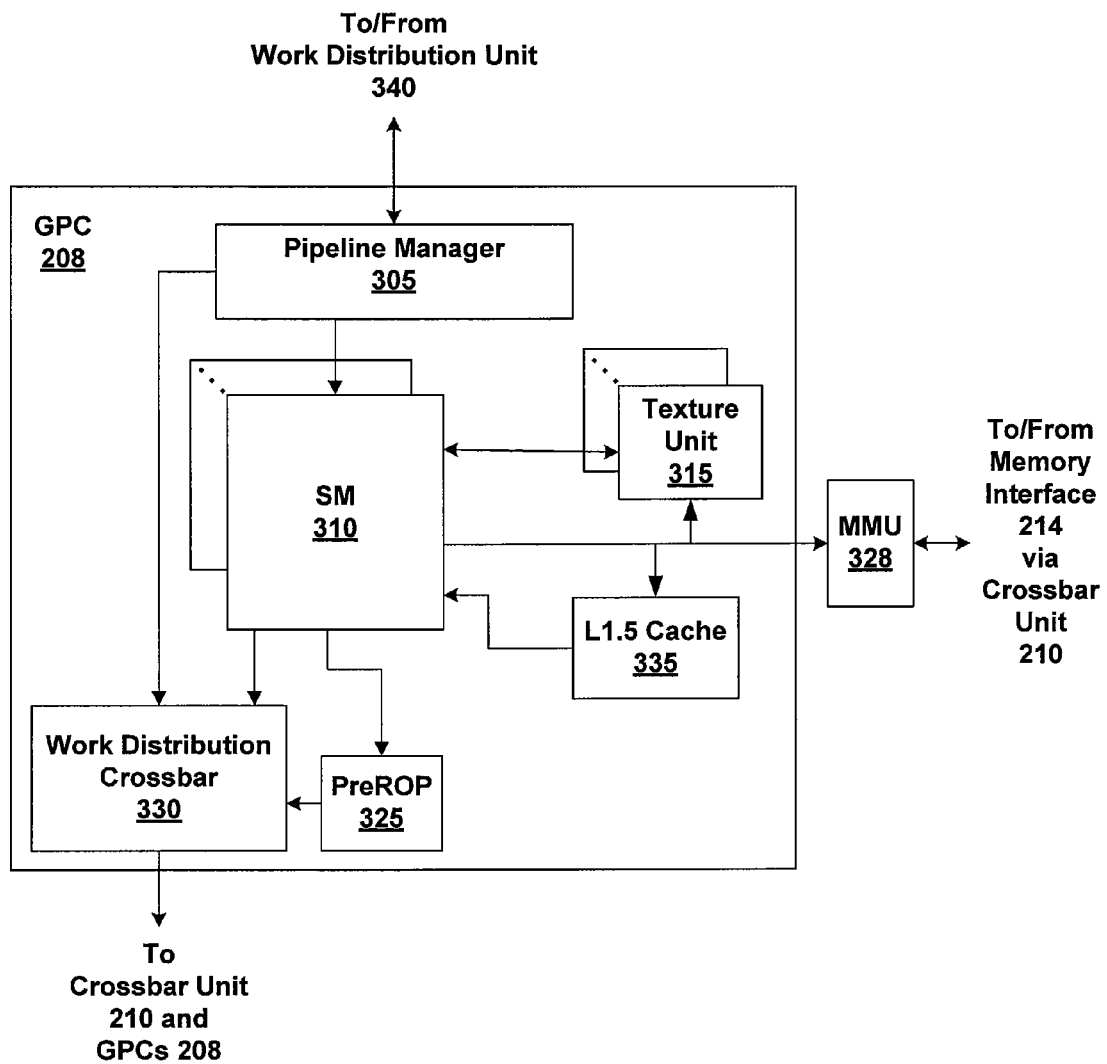
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within memory interface 214, multiprocessor SM 310, or L1 cache 320. MMU 328 is configured to map virtual addresses to physical addresses via page tables 420. MMU 328 may include address translation lookaside buffers (TLB) or caches to store portions of page tables 420. The physical address is processed to distribute surface data access locality to allow efficient request interleaving among partition units 215. The cache line index may be used to indicate whether a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
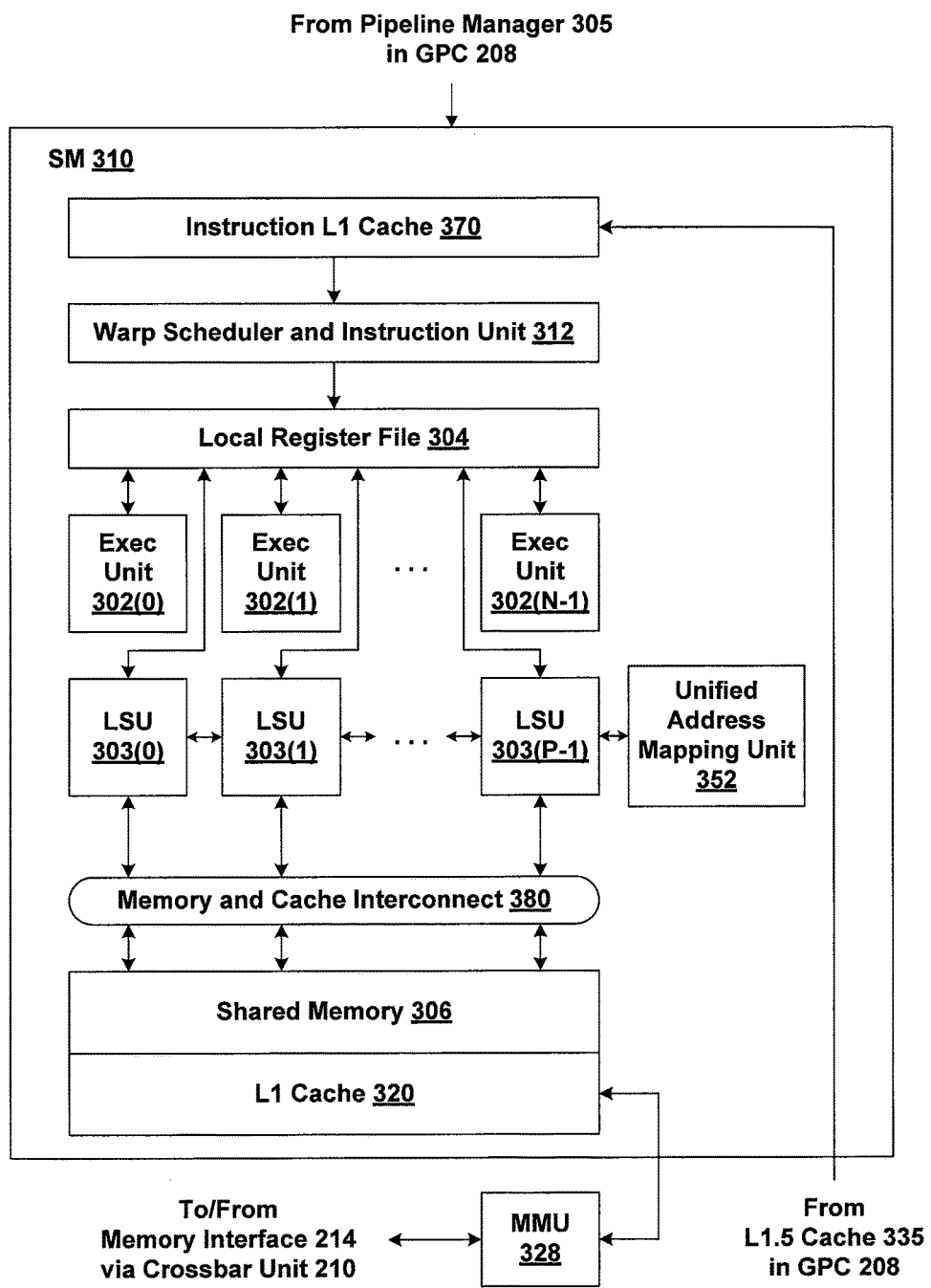
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Independent Virtual Address Spaces

Embodiments of the present invention enable a parallel processing subsystem, such as a GPU, to simultaneously execute thread programs having different, independent virtual address spaces. Each virtual address space may coexist with one or more other virtual address spaces, enabling the GPU to simultaneously execute the thread programs. Each thread program may operate within a virtual address space associated with a corresponding application process, which may allocate memory and pass virtual address references to the thread program. By enabling the parallel processing system to simultaneously execute multiple thread programs in different virtual address spaces, greater GPU utilization and performance may be achieved for a broader range of applications.

Figure 4A:
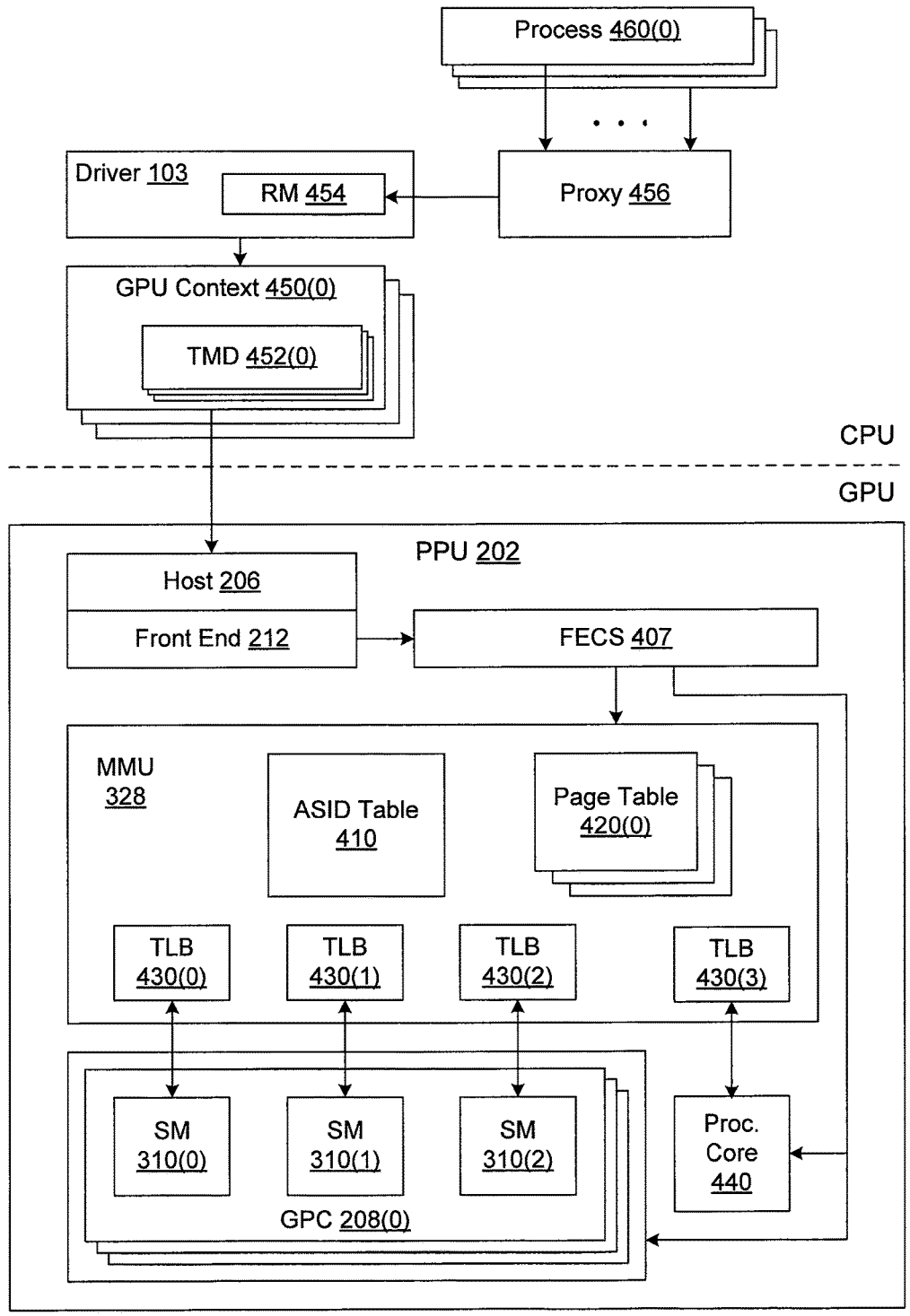
FIG. 4A illustrates a parallel processing subsystem configured to implement multiple concurrent virtual address spaces, according to one embodiment of the present invention.

FIG. 4A illustrates parallel processing subsystem 112 of FIG. 1 configured to implement multiple concurrent virtual address spaces, according to one embodiment of the present invention. In certain embodiments, parallel processing subsystem 112 comprises a GPU. For embodiments implementing unified virtual memory (UVM), each application process 460 may include GPU computation tasks to be performed within a virtual address space that is unified between the application process 460 and any associated GPU computation tasks. This unification allows the application process 460 and GPU computation tasks to seamlessly communicate memory references. In general, each application process 460 operates within a different virtual address space from other application processes 460. Each application context includes an application context page table maintained by a host operating system for mapping the virtual address space associated with the application to a physical address space typically shared by the application processes 460.

A given application process 460 may initiate execution of a GPU computation task via an execution request to driver 103, which responds by adding execution information for the GPU computation task to a GPU context 450 and adding the GPU context 450 to a queue of work for the GPU. The GPU context 450 includes task metadata (TMD) 452, comprising information for executing one or more thread programs that implement one or more GPU computation tasks that may execute simultaneously within the GPU. The one or more thread programs may be associated with one or more different virtual address spaces defined within the same GPU context 450. A page table for one virtual address space is defined for one instance of TMD 452. Each instance of TMD 452 comprises execution information for one associated thread program within one GPU context 450.

A page table within a given TMD 452 may be derived from a corresponding application context page table. Alternatively, a page table within a given TMD 452 may reference a corresponding application context page table. In one embodiment, application contexts 450 reside within system memory 104. A resource manager (RM) 454 within driver 103 is configured to pack the one or more thread programs, each assigned to a TMD 452, into one GPU context 450 for simultaneous execution within a single GPU context. In one embodiment, proxy 456 comprises a user space process configured to communicate requests to RM 454. For example, certain execution requests and allocation requests may be transmitted to RM 454 via proxy 456.

As described previously in FIG. 2, host 206 is configured to retrieve data residing in a memory, such as system memory 104. The data may comprise information related to one or more GPU contexts 450 queued up for execution. Host 206 sequentially selects one GPU context 450 at a time for execution Front end 212 reads TMDs 452 within a GPU context 450 and configures PPU 202 to execute one or more thread programs based on the GPU context 450. Front end context switch (FECS) 407 configures MMU 328 to provide proper virtual address to physical address mapping. Execution of a given GPU context 450 needs to wait until all page tables associated with the GPU context 450 are configured by FECS 407. In one implementation, FECS 407 generates a "done" signal to indicate that page table and related configuration steps are complete, thereby prompting FE 212 to indicate page table configuration completion to task/work unit 207. This indication enables task/work unit 207 to begin scheduling tasks associated with the page table.

Each page table within TMD 452 is associated with an address space identifier (ASID) by FECS 407 via a bind command transmitted to MMU 328. Each thread program is associated with an ASID, which is appended to each virtual memory request generated by the thread program during the course of execution. For example, if a given GPU context 450 includes execution information for two different thread programs and each is associated with a different virtual address space, then one of the two thread programs may be associated with ASID=0 and the other of the two thread programs may be associated with ASID=1. In this example, GPU context 450 also includes one page table for a virtual address space zero (ASID=0) and a different page table for virtual address space one (ASID=1). During the course of execution, each virtual memory access request generated by the first thread program includes a virtual address and an ASID of 0. Page table lookup requests from this thread program are directed to the page table for ASID=0. Similarly, each virtual memory access request generated by the second thread program includes a virtual address and an ASID of 1. Page table lookup requests from this thread program are directed to the page table for ASID=1.

Processing core 440 is configured to perform a certain set of predetermined tasks, such as copying a block of memory from one address range to another address range. Processing core 440 receives work from FECS 407 and may operate in conjunction with SMs 310, but may not require general programmability. In one embodiment host 206 directs the operation of processing core 440.

MMU 328 includes ASID table 410, page tables 420, and TLBs 430. ASID table 410 includes one or more ASID table entries that associate an ASID with a corresponding page table 420. In general, each memory request generated by a thread program executing within an SM 310 includes a virtual address and an ASID value to select one page table 420 to perform a mapping from the virtual address to a physical address. ASID table 410 maps an ASID value to a corresponding page table 420. The page table 420 then provides a mapping from a virtual address to a physical address. Page tables 420 are shown within MMU 328, but may reside within any technically feasible memory subsystem, such as system memory 104 or PP memory 204.

TLBs 430 are configured to cache virtual address to physical address mappings, with each mapping represented as a cache entry. Each cache entry tag comprises an ASID and a virtual address. Each cache entry value comprises a physical address. A TLB hit occurs when TLB 430 includes a cache entry that matches both ASID and virtual address inputs for a memory access request. In the case of a TLB hit, the TLB provides a corresponding physical address for the memory access request. A TLB miss occurs when TLB 430 does not include a cache entry that matches both ASID and virtual address inputs. TLB 430 may implement any technically feasible technique to determine whether the ASID input and virtual address input together represent a TLB hit or a TLB miss. In one embodiment, a content addressable memory circuit is configured to store an ASID and a virtual address pair as a search tag for determining a hit or miss. A corresponding physical address stored within the TLB is selected to complete a virtual to physical mapping when the content addressable memory matches an input ASID and virtual address pair to a previously stored tag, indicating a TLB hit. Such a technique may be fully associative with respect to the search tag. Other techniques may implement different degrees of associativity. In the case of a TLB miss, the MMU 328 selects one page table 420 identified by an ASID comprising the memory access request, and performs a virtual address to physical address translation via the identified page table 420 based on a memory access request for a virtual address. Any technically feasible technique may be used to perform the virtual to physical translation once one page table 420 is identified to provide page table information for the translation operation. If the page table 420 is not able to map the virtual address to a physical address, then the memory access request produces an error indicating that the memory access request is not valid.

A particular ASID used by a thread program within an SM 310 may be associated with a specific page table 430 via a bind command, which is generated and transmitted from FECS 407 to MMU 328. The bind command may also be used to invalidate virtual to physical mapping data residing within the TLB 430. In this way, ASID values may be reused over sequentially executed GPU contexts 450.

Figure 4B:
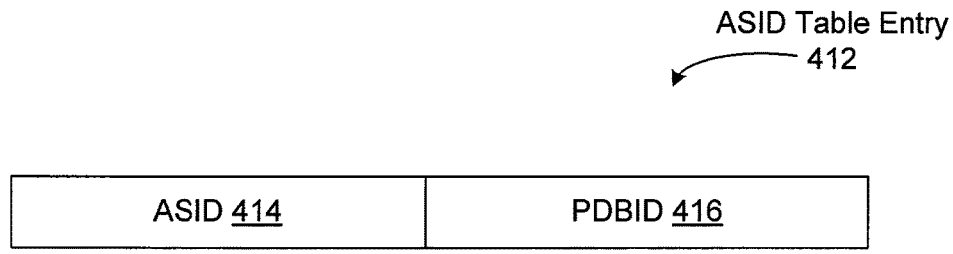
FIG. 4B illustrates an address space identifier table entry, according to one embodiment of the present invention.

FIG. 4B illustrates an ASID table entry 412, according to one embodiment of the present invention. ASID table entry 412 includes an ASID field 414, and a corresponding page data bind identifier (PDBID) field 416, which points to a page table residing in memory for the ASID value specified in ASID field 414. In one embodiment PDBID 416 is a page directory base (PDB), which corresponds to a physical address reference for page tables 420 in memory. The page table may reside within PPU memory 204, or system memory 104.

Figure 4C:
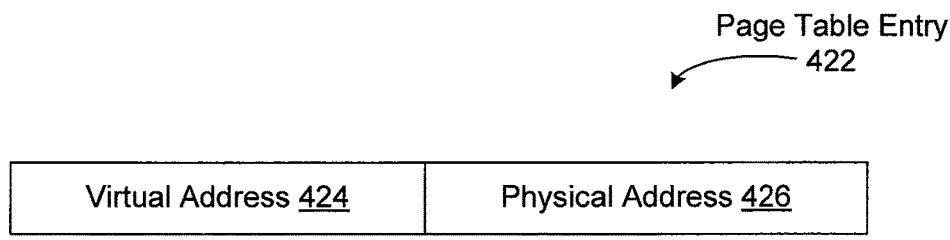
FIG. 4C illustrates a page table entry, according to one embodiment of the present invention.

FIG. 4C illustrates a page table entry 422, according to one embodiment of the present invention. Page table entry (PTE) 422 includes a virtual address field 424 and a corresponding physical address field 426. A given page table is associated with a particular ASID, which is implicitly associated with a virtual address specified in virtual address field 424.

Figure 4D:
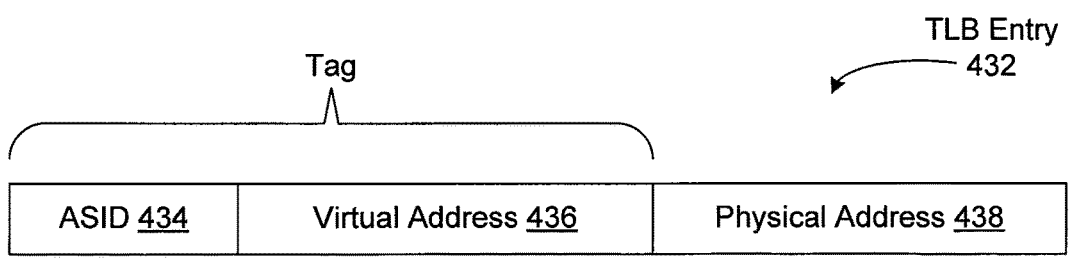
FIG. 4D illustrates translation look-aside buffer entry, according to one embodiment of the present invention.

FIG. 4D illustrates TLB entry 432, according to one embodiment of the present invention. TLB entry 422 includes an ASID field 434, a virtual address field 436, and a corresponding physical address field 438. ASID field 434 and virtual address field 436 comprise a lookup tag for finding physical address field 438. A given TLB 430 may include multiple TLB entries 432, having a mix of ASID values within ASID field 434. The TLB 430 is able to cache virtual address to physical address mappings for independent virtual address spaces by including ASID field 434 as part of the lookup tag in a virtual to physical mapping operation specified by TLB entry 432.

Figure 5:
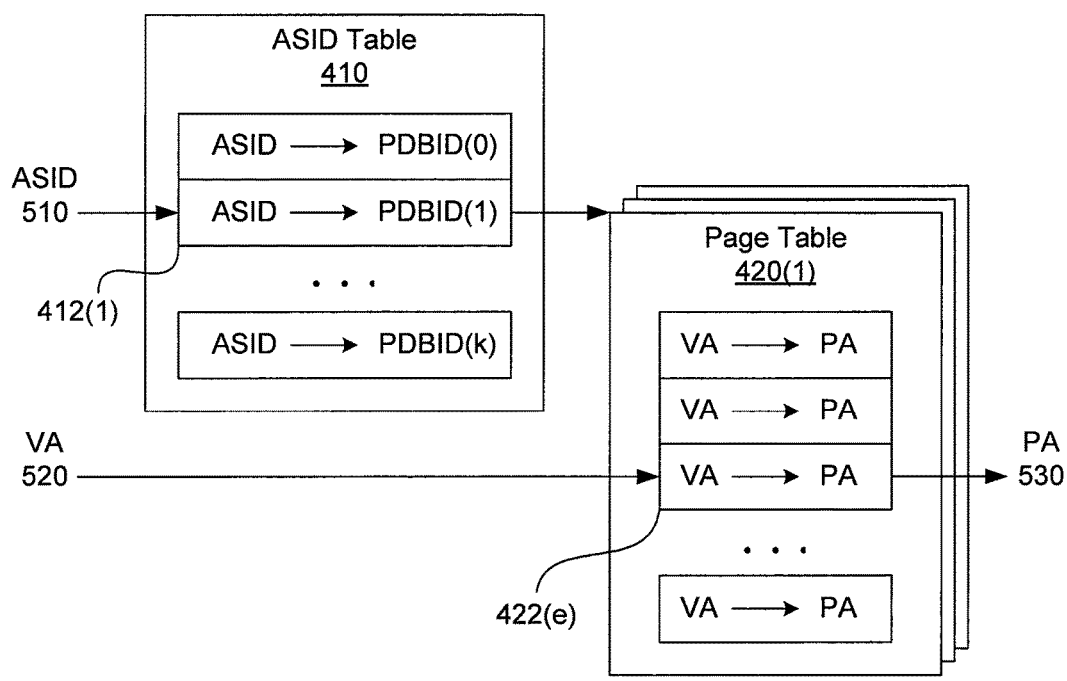
FIG. 5 illustrates translating an address space identifier and virtual address to a physical address, according to an embodiment of the present invention.

FIG. 5 illustrates translating an ASID and a virtual address (VA) to a physical address (PA), according to one embodiment of the present invention. This operation may be performed in response to a miss within a TLB 430. ASID 510 and VA 520 comprise a lookup request. ASID 510 is used to perform a lookup within ASID table 410. In this example, the lookup matches ASID stored within ASID table entry 412(1), which references page table 420(1). From here, VA 520 is used to perform a lookup within page table 420(1). In this example, the lookup matches VA field 424 of PTE 422(e). A corresponding PA field 426 within PTE 422(e) completes a mapping operation to PA 530, which is set to the value of PA field 426 within PTE 422(e). Multiple page tables 420 may remain active at any one time, and TLBs 430 may retrieve virtual to physical address mappings from any one of the multiple page tables 420 on a TLB miss. Maintaining a different page table 420 per virtual address space, as specified by ASID, enables multiple virtual address spaces to coexist and map to a common physical address space, as illustrated below in FIG. 6. In one embodiment ASID specifies both a GPU context and a particular page table identifier associated with the GPU context.

Figure 6:
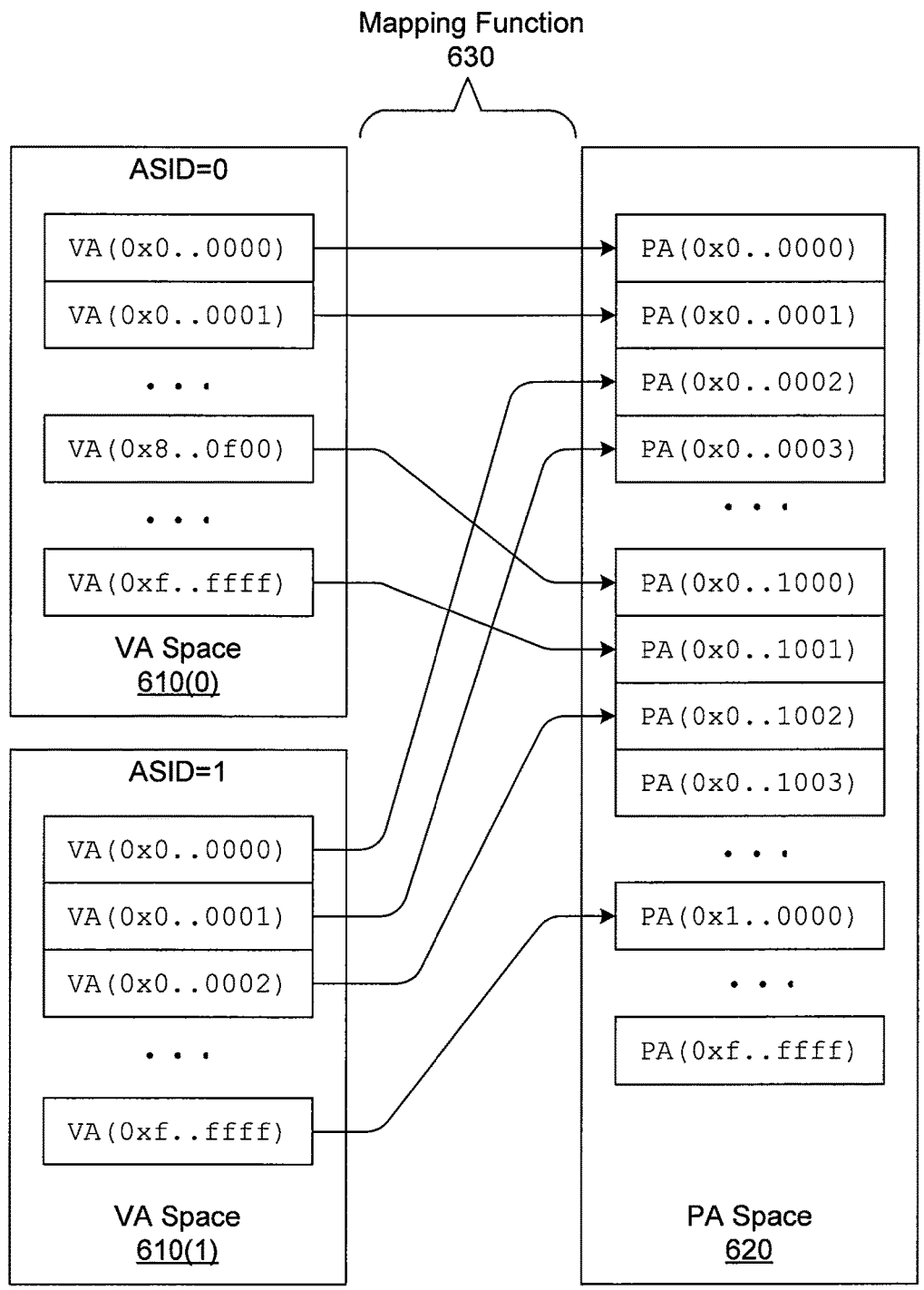
FIG. 6 illustrates two concurrent virtual address spaces co-existing within one physical address space, according to one embodiment of the present invention.

FIG. 6 illustrates two concurrent virtual address spaces 610(0), 610(1) co-existing within one physical address space 620, according to one embodiment of the present invention. VA space 610(0) includes a plurality of virtual address pages that map to corresponding physical address pages within PA space 620, via mapping function 630. Similarly, VA space 610(1) includes a plurality of virtual address pages that map to corresponding physical address pages in PA space 620.

As shown, VA space 610(0) includes a VA page at 0x0 . . . 0000 that maps to PA page 0x0 . . . 0000, and a VA page at 0x0 . . . 0001 that maps to PA page 0x0 . . . 0001. VA space 610(1) also includes VA pages at 0x0 . . . 0000 and 0x0 . . . 0001, but these VA pages map to PA pages 0x0 . . . 0002 and 0x0 . . . 0003, respectively. An application context 405 may include memory allocated within virtual address space 610(0) and a different application context may include memory allocated within virtual address space 610(1). By maintaining different virtual address spaces, identified by ASID, resources may be consistently managed and allocated from application code executing on CPU 102 through thread programs executing on parallel processing subsystem 112. In one usage model, a particular PA page is mapped into two or more VA spaces. In such a usage model, the PA page comprises a shared memory page having two or more different virtual address representations in corresponding execution contexts.

Figure 7:
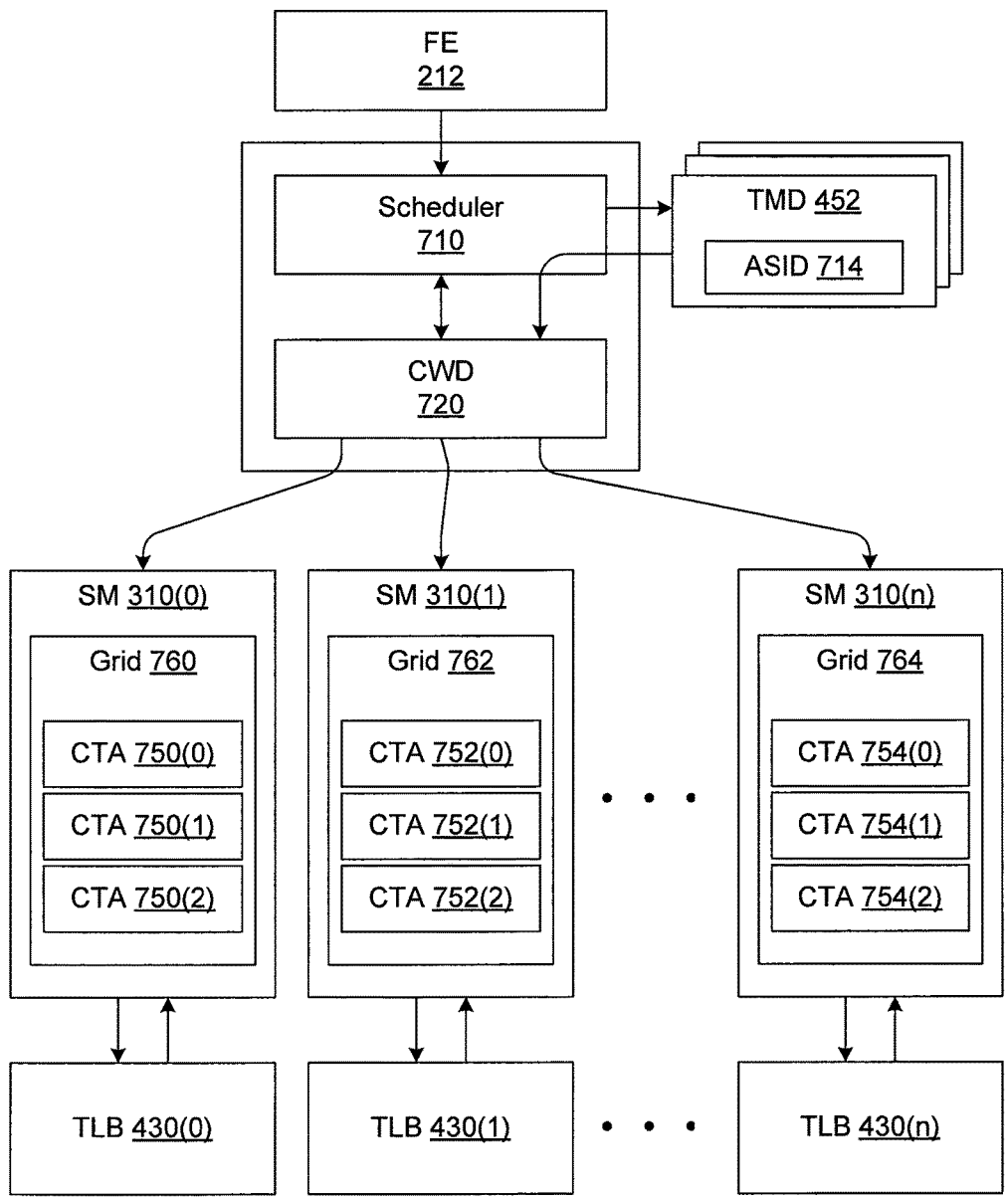
FIG. 7 illustrates configuring a parallel processing subsystem to execute multiple thread programs having different virtual address spaces, according to one embodiment of the present invention.

FIG. 7 illustrates initializing parallel processing subsystem 112 to execute multiple thread programs having different virtual address spaces comprising one context, according to one embodiment of the present invention. FE 212 reads TMDs 452 of FIG. 4A comprising a GPU context 450 selected for execution by host 206. Each TMD 452 includes an ASID 714. In one embodiment, RM 454 assigns an ASID 714 to each different TMD 452. Scheduler 710 determines that a particular TMD 452 should be scheduled to execute and transmits an execution request to compute work distributor (CWD) 720, which distributes the work for the TMD 452 among one or more SMs 310 to establish a grid of one or more CTAs specified by the TMD 452. As discussed previously in FIG. 3B, each CTA may comprise one or more thread groups. Each thread group of a CTA is bound to a common ASID 714. In one embodiment, scheduler 710 comprises task management unit 300 of FIG. 3A and CWD 720 comprises work distribution unit 340.

Different distribution strategies may be implemented for mapping a grid of CTAs onto available SMs 310. One approach, referred to herein as "deep allocation" preferentially assigns CTAs associated with the same grid to a minimum number of different SMs 310 to generally maximize cache affinity for both TLB caching as well as data caching. For example, if one SM 310 is able to accommodate a complete grid, then CWD 720 assigns all CTAs for the grid on one SM 310. Continuing the example, grid 760 comprises CTAs 750, which are assigned to SM 310(0). Similarly, grid 762 comprises CTAs 752, which are assigned to SM 310(1), and grid 764 comprises CTAs 754, which are assigned to SM 310(n). CTAs 750 are likely to exhibit cache affinity for both TLB lookups and data caching. Similarly, CTAs 752 and 754 are likely to exhibit similar cache affinities, which generally improve overall performance.

Deep allocation is appropriate for scenarios where multiple, different virtual address spaces are needed to accommodate simultaneous execution of different thread programs that are multiplexed into a common GPU context. Deep allocation generally maximizes GPU utilization by allowing multiple smaller grids simultaneously. Deep allocation is enabled by embodiments of the present invention that allow multiple virtual address spaces required by the different grids to coexist within TLBs 430 and the MMU 328. Wide allocation spreads CTAs associated with a particular grid over available SMs 310. Wide allocation is appropriate for scenarios where one grid is configured to require a large number of CTAs that all operate within the same virtual address space. Wide allocation generally maximizes performance of an individual task by generally maximizing parallelism among threads associated with the task. Detecting that deep allocation should be used is facilitated by the attribute ASID 714 of each TMD 452. For example, when multiple, different ASID values are represented among multiple TMDs 452 within one GPU context 450 being scheduled for execution, then deep allocation may be preferred over wide allocation.

Figure 8:
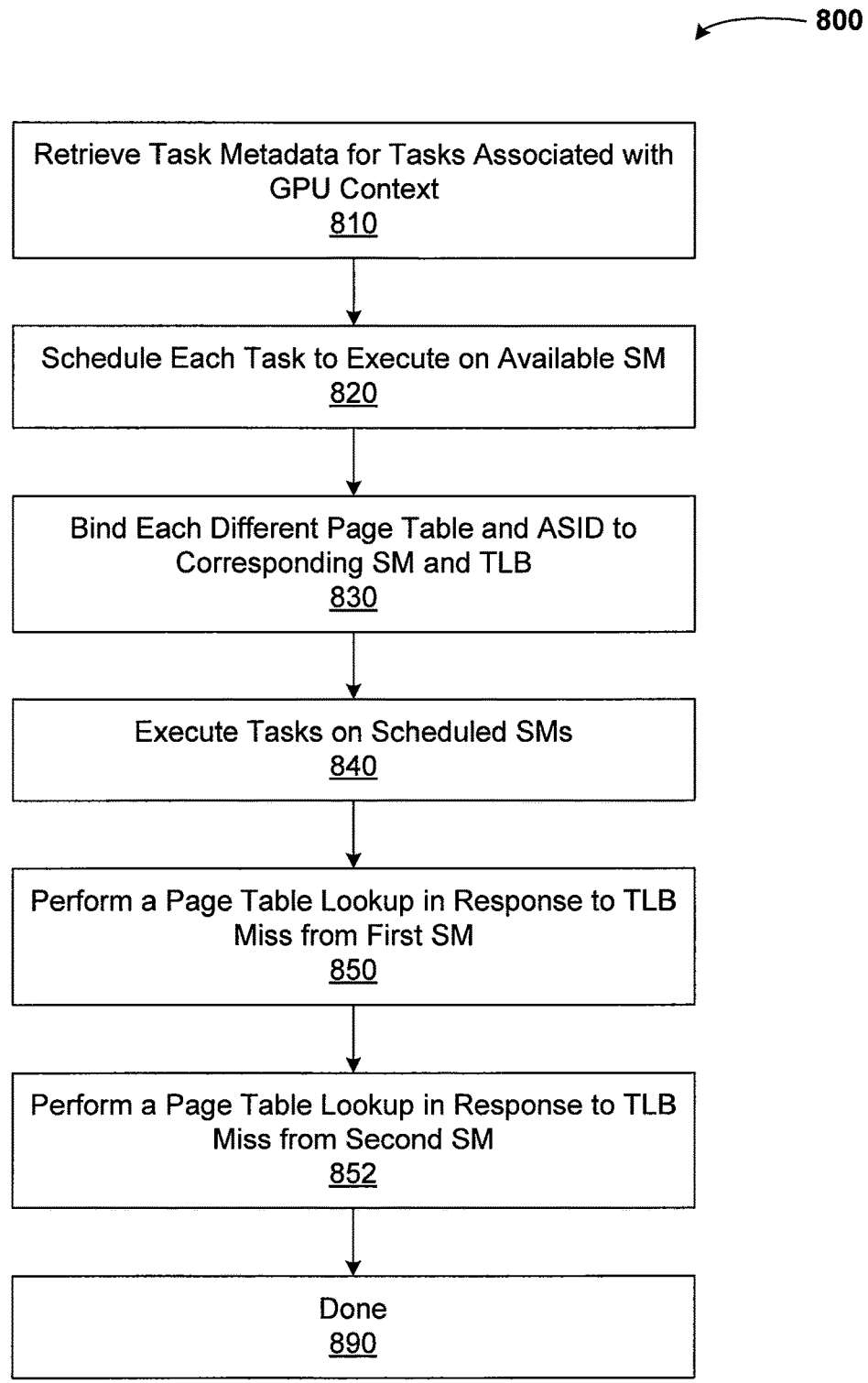
FIG. 8 is a flow diagram of method steps for concurrently executing two or more tread programs that have different virtual address spaces on the parallel processing subsystem, according to one embodiment of the present invention.

FIG. 8 is a flow diagram of method 800 for concurrently executing two or more tread programs that have different virtual address spaces on the parallel processing subsystem, according to one embodiment of the present invention. Although method 800 is described in conjunction with the systems of FIGS. 1, 2, 3A, 3B, 3C, 4A, 5, and 7, persons of ordinary skill in the art will understand that any system configured to perform the method steps, in any order, is within the scope of the invention. In one embodiment, method 800 is performed by a PPU, such as PPU 202 of FIG. 2.

Method 800 begins in step 810, where the PPU retrieves a set of TMD descriptions for tasks associated with a GPU context, such as GPU context 450 of FIG. 4A. Each TMD includes information for executing a task, on the PPU. The information includes references to a thread program that implements the task, and a corresponding page table for translating virtual addresses generated by the task into physical addresses. In step 820, a scheduler within the PPU schedules each task to execute on an available SM, such as an SM 310 of FIG. 3B. In step 830, a front end context switch unit within the PPU binds each different page table and corresponding ASID within the GPU context to an SM and TLB. Binding has the effect of associating a page table and ASID for the page table to a thread program configured to use the virtual address space identified by the ASID and mapped by the page table. Binding may also have the effect of invalidating a TLB in preparation for executing the GPU context, which represents a new context that is unrelated to previously cached mappings residing within the TLB.

In step 840, the PPU executes each task scheduled on a corresponding SM. During the course of execution, each task may generate one or more memory access requests to an associated virtual address space. The virtual address space is identified by an ASID value bound to the task. A memory access request to a virtual address will initially cause a TLB miss. A first TLB miss will occur as a consequence of a first SM generating a first memory access request to a first virtual address for the first time. A second TLB miss will occur as a consequence of a second SM generating a second memory access request to a second virtual address for the first time. Each memory access request includes a virtual address and an ASID. Both the virtual address and the ASID must match a TLB entry tag residing within a target TLB for the TLB to generate a hit. A TLB hit indicates that the virtual address and ASID comprising a memory access request has a cached mapping within a target TLB. A TLB miss indicates that the TLB does not currently have a cached mapping for a requested virtual address and ASID. In step 850, an MMU within the PPU, such as MMU 328 of FIG. 3B, performs a first page table lookup in response to the first TLB miss from the first SM. This first page table lookup produces a first mapping from the combination of a first virtual address and a first ASID to a corresponding physical address. The first mapping is cached within the first target TLB. In step 852, the MMU performs a second page table lookup in response to the second TLB miss. The second memory access request comprises a second ASID, requiring the MMU to perform the second page table lookup using a second page table, identified by the second ASID. The second mapping is cached within the second target TLB. The first target TLB and second target TLB may comprise the same TLB unit, such as a TLB 430. In one embodiment, each page table lookup involves page table walking to find an appropriate mapping for each virtual address within the corresponding virtual address space. Any technically feasible page table walking technique may be implemented without departing the scope and spirit of the present invention.

The method terminates in step 890.

Figure 9:
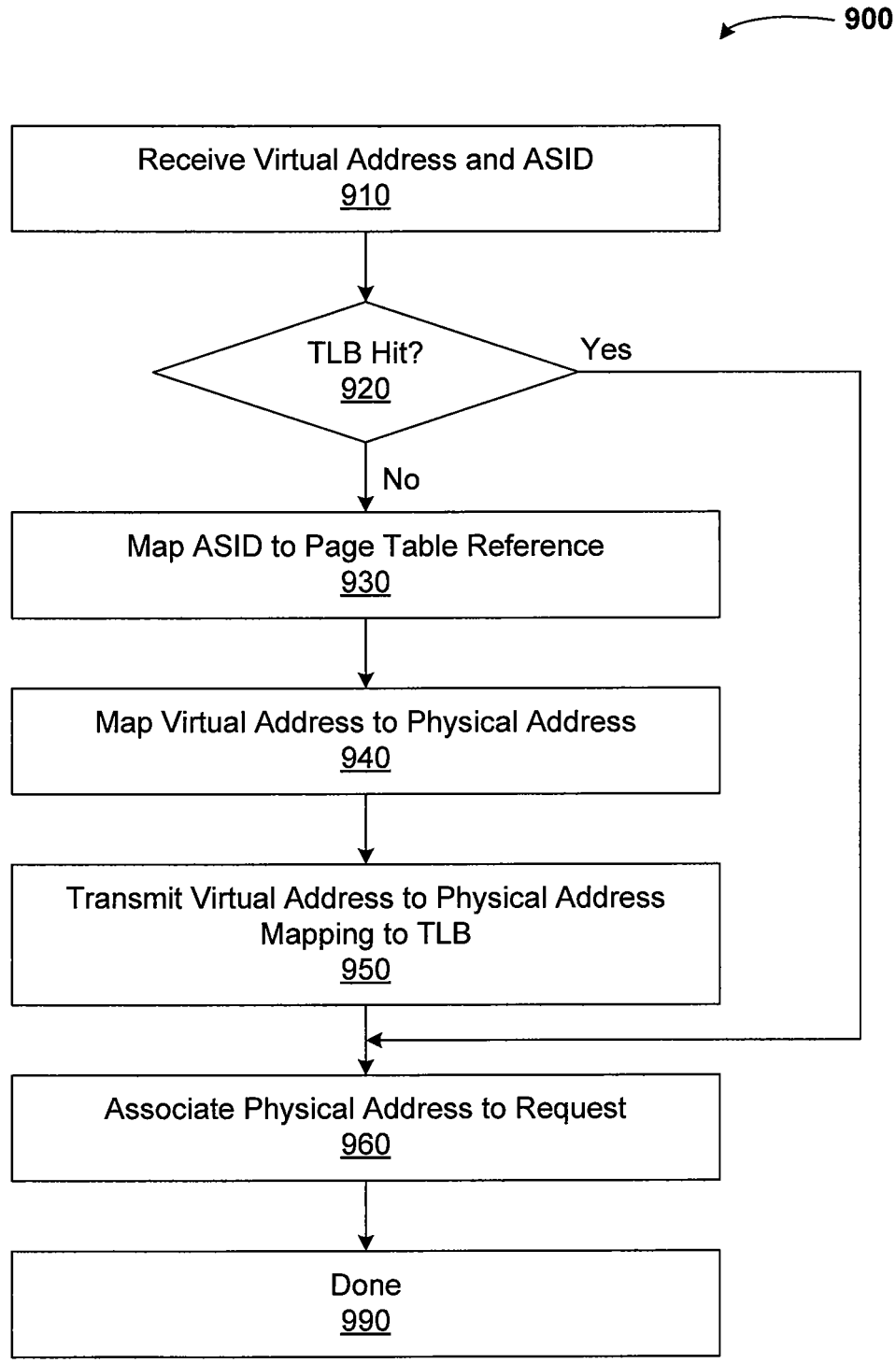
FIG. 9 is a flow diagram of method steps for performing a virtual to physical address mapping in one of a plurality of different virtual address spaces, according to one embodiment of the present invention.

FIG. 9 is a flow diagram of method steps for performing a virtual to physical address mapping in one of a plurality of different virtual address spaces, according to one embodiment of the present invention. Although method 900 is described in conjunction with the systems of FIGS. 1, 2, 3A, 3B, 3C, 4A, 5, and 7, persons of ordinary skill in the art will understand that any system configured to perform the method steps, in any order, is within the scope of the invention. In one embodiment, method 900 is performed by a PPU, such as PPU 202 of FIG. 2.

Method 900 begins in step 910, where an MMU within the PPU receives a virtual address to physical address mapping request comprising a virtual address and an ASID to specify which one of the plurality of different virtual address spaces should be used to perform the mapping. If, in step 920, the mapping request does not comprise a TLB hit, then the method proceeds to step 930. In step 930, the MMU maps the ASID to a page table reference via an ASID table, such as ASID table 410. In step 940, the MMU maps the virtual address to a physical address using the page table referenced by the page table reference. In step 950, the MMU transmits the virtual address to physical address mapping to the target TLB for caching and later use. In step 960, the MMU associates a physical address to the mapping request to enable and associated memory access request to proceeds. The method terminates in step 990.

Returning to step 920, if the mapping request does comprise a TLB hit, then the method proceeds to step 960.

Figure 10:
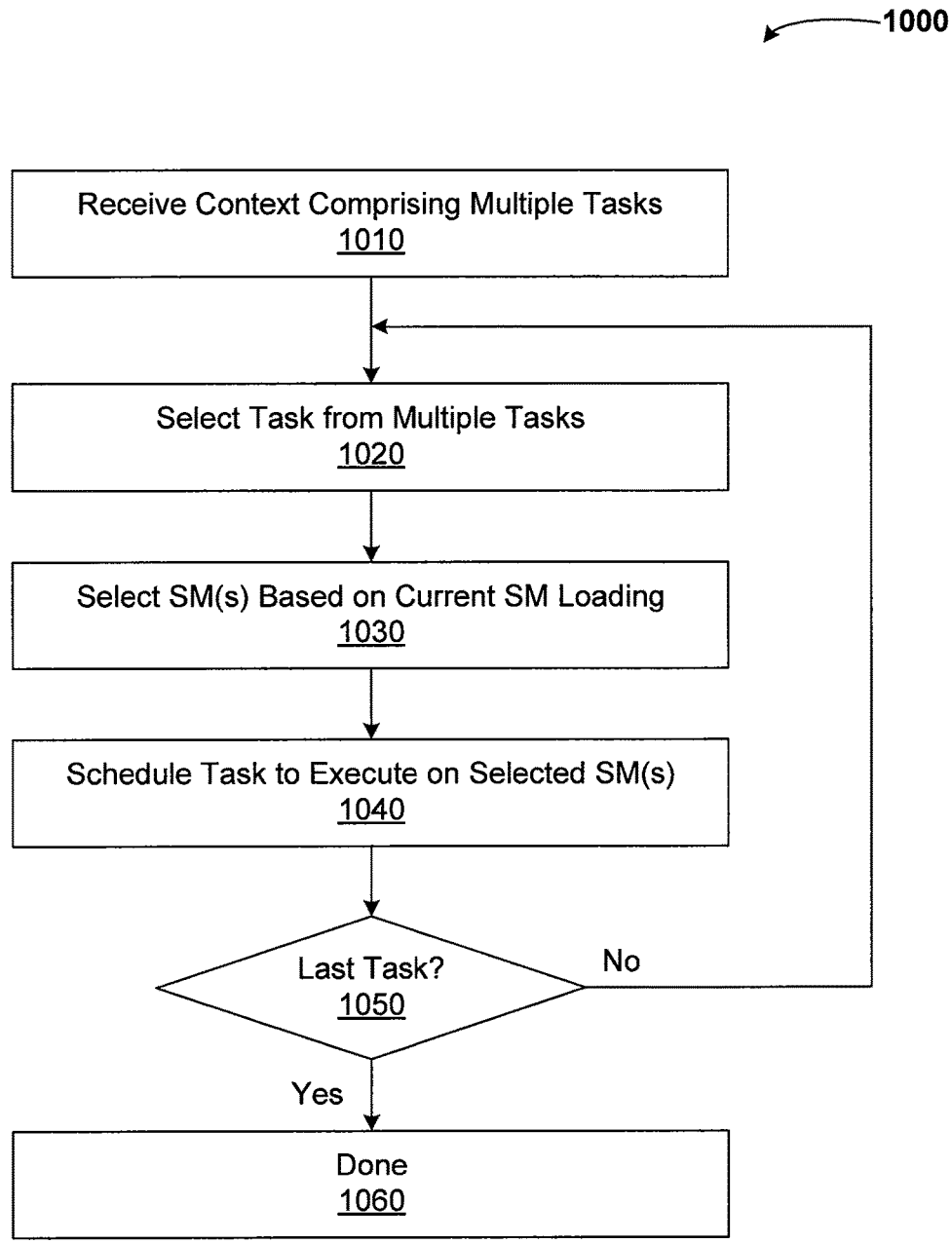
FIG. 10 is a flow diagram of method steps for performing deep scheduling for tasks within a graphics processing unit context, according to one embodiment of the present invention.

FIG. 10 is a flow diagram of method steps for performing deep scheduling for tasks within a graphics processing unit context, according to one embodiment of the present invention. Although method 1000 is described in conjunction with the systems of FIGS. 1, 2, 3A, 3B, 3C, 4A, 5, and 7, persons of ordinary skill in the art will understand that any system configured to perform the method steps, in any order, is within the scope of the invention. In one embodiment, method 1000 is performed by a PPU, such as PPU 202 of FIG. 2.

Method 1000 begins in step 1010, where a compute work distributor (CWD) within the PPU receives a GPU context, such as GPU context 450, comprising multiple tasks to execute concurrently within the PPU. In step 1020, the CWD selects a task from the multiple tasks comprising the GPU context. In step 1030, the CWD selects one or more SMs from a pool of SMs based on execution requirements for the selected task and currently available of resources in the pool of SMs. In this step, the CWD attempts to minimize the number of different SMs within which the selected task is scheduled to execute. Any technically feasible technique may be implemented to map task requirements onto available resources to satisfy the task requirements. In step 1040, the CWD schedules the selected task for execution the one or more SMs selected from the pool of SMs. If, in step 1050, the selected task is not the last task residing in the GPU context, then the method proceeds to step 1020. Otherwise, the method terminates in step 1060.

In one embodiment, CWD is configured to schedule an entire GPU context according to deep scheduling or wide scheduling techniques, based on explicit instructions. The explicit instructions may be conveyed programmatically or via one or more environment variables. In other embodiments, the CWD may schedule each task within a GPU contest individually according to deep scheduling or wide scheduling techniques according to explicit instructions. Alternatively, the CWD may infer which scheduling techniques to implement and on which tasks, based on different ASID values associated with each task.

While the above discussion focuses on organizing different tasks for execution into a common GPU context, parallel co-processors configured to execute multiple simultaneous contexts having different virtual address spaces are within the scope and spirit of embodiments of the present invention.

In certain embodiments, data caches are tagged with respect to physical addresses. In alternative embodiments, data caches are tagged with respect to virtual addresses and require an ASID as part of each tag. Both tagging regimes may be combined within a single GPU.

In sum, a technique is disclosed for concurrently executing different tasks having a different virtual address spaces on the same GPU. Each task is associated with a virtual address space via an address space identifier (ASID). A virtual memory request generated by an executing task includes the ASID, which is used to select a corresponding page table. The selected page table is then used to map the virtual address comprising a virtual memory request to a physical address. The page tables are established from corresponding page tables maintained by an operating system for user application processes that invoke the tasks. A translation look-aside buffer (TLB) caches virtual memory request address mappings for future use. A TLB entry includes a tag comprising the ASID and virtual address, and a data field comprising the corresponding physical address. In one embodiment, the tasks are organized into a common context for execution. The tasks may be scheduled according to a deep scheduling regime, whereby tasks sharing a common virtual address space execute on a minimal number of different SMs.

One advantage of the present invention is that a GPU may simultaneously execute different tasks having different virtual address spaces, thereby improving GPU utilization and performance in certain applications.

Another advantage of embodiments of the present invention is that GPU tasks are able to execute with address space isolation, which improves reliability and reduces development effort associated with debugging.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

What is claimed is:

1. A method for scheduling tasks for execution in a parallel processor comprising two or more streaming multiprocessors, the method comprising:
   receiving a set of tasks associated with a first processing context related to a first page table included in a plurality of page tables;
   selecting a first task that is associated with a first address space identifier (ASID) from the set of tasks and associated with the first processing context;
   determining a minimum a number of streaming multiprocessors included in the two or more streaming multiprocessors able to execute the tasks included in the set of tasks based on a number of tasks each streaming multiprocessor is able to execute concurrently, wherein the minimum number of streaming multiprocessors includes at least a first streaming multiprocessor;
   assigning the tasks included in the set of tasks to the minimum number of streaming multiprocessors;
   selecting the first streaming multiprocessor from the two or more streaming multiprocessors to execute the first task;
   scheduling the first task to execute on the first streaming multiprocessor;
   selecting a second task that is associated with a second ASID from the set of tasks and associated with the first processing context; and
   scheduling the second task to execute on the first streaming multiprocessor, wherein scheduling the second task occurs prior to scheduling any other task from the set of tasks to execute on a second streaming multiprocessor included in the two or more streaming multiprocessors.

2. The method of claim 1, wherein selecting the first streaming multiprocessor comprises identifying that the first streaming multiprocessor has previously been assigned a task included in the set of tasks associated with the first processing context, which establishes that the first streaming multiprocessor has an affinity to the first processing context.

3. The method of claim 2, wherein selecting the first streaming multiprocessor minimizes a maximum prevailing workload for all streaming multiprocessor executing tasks associated with the first processing context.

4. The method of claim 1, wherein the first task comprises a thread grid.

5. The method of claim 1, wherein the first page table includes virtual address to physical address mappings associated with a first virtual address space corresponding to the first processing context, and a second page table includes virtual address to physical address mappings associated a second virtual address space corresponding to the first processing context.

6. The method of claim 1, wherein the first page table and a second page table are included in the plurality of page tables, and each page table included in the plurality of page tables includes virtual address to physical address mappings associated a different virtual address space.

7. The method of claim 1, further comprising:
receiving a bind command from a front end context switch; and
in response, associating the first page table with the first ASID.

8. The method of claim 1, further comprising:
receiving a bind command from a front end context switch; and
in response, invalidating one or more entries in a first translation lookaside buffer (TLB) that are associated with the first context.

9. The method of claim 1, wherein the first task is associated with a first thread program executing on the first streaming multiprocessor and the second task is associated with a second thread program executing on the first streaming multiprocessor.

10. The method of claim 9, wherein the first streaming multiprocessor simultaneously executes the first thread program and the second thread program within the first processing context.

11. A non-transitory computer-readable storage medium including instructions that, when executed by a processing unit, cause the processing unit to schedule tasks for execution on a first streaming multiprocessor unit, the method comprising:
receiving a set of tasks associated with a first processing context related to a first page table included in a plurality of page tables;
selecting a first task that is associated with a first address space identifier (ASID) from the set of tasks and associated with the first processing context;
determining a minimum number of streaming multiprocessors included in the two or more streaming multiprocessors able to execute the tasks included in the set of tasks based on a number of tasks each streaming multiprocessor is able to execute concurrently, wherein the minimum number of streaming multiprocessors includes at least a first streaming multiprocessor;
assigning the tasks included in the set of tasks to the minimum number of streaming multiprocessors;
selecting the first streaming multiprocessor from the two or more streaming multiprocessors to execute the first task;
scheduling the first task to execute on the first streaming multiprocessor;
selecting a second task that is associated with a second ASID from the set of tasks and associated with the first processing context; and
scheduling the second task to execute on the first streaming multiprocessor, wherein scheduling the second task occurs prior to scheduling any other task from the set of tasks to execute on a second streaming multiprocessor included in the two or more streaming multiprocessors.

12. The computer-readable storage medium of claim 11, wherein selecting the first streaming multiprocessor comprises identifying that the first streaming multiprocessor has previously been assigned a task associated with the first processing context, which establishes that the first streaming multiprocessor has an affinity to the first processing context.

13. The computer-readable storage medium of claim 12, wherein selecting the first streaming multiprocessor minimizes a maximum prevailing workload for all streaming multiprocessor executing tasks associated with the first processing context.

14. The computer-readable storage medium of claim 11, wherein the first task comprises a thread grid.

15. The computer-readable storage medium of claim 11, wherein selecting the first streaming multiprocessor maximizes at least one of a translation lookaside buffer (TLB) cache affinity and a data cache affinity relative to the tasks included in the set of tasks.

16. The computer-readable storage medium of claim 11, further comprising determining that the tasks included in the set of tasks are associated with a first number of different ASIDs, and in response, determining that the tasks included in the set of tasks should be assigned to the minimum number of streaming multiprocessors included in the two or more streaming multiprocessors.

17. A computing device, comprising:
a central processing unit that executes a process having a first processing context; and
a parallel processing subunit coupled to the central processing unit, comprising:
a subsystem that includes a streaming multiprocessor that:
receives a set of tasks associated with a first processing context related to a first page table included in a plurality of page tables;
selects a first task that is associated with a first address space identifier (ASID) from the set of tasks and associated with the first processing context;
determines a minimum number of streaming multiprocessors included in the two or more streaming multiprocessors able to execute the tasks included in the set of tasks based on a number of tasks each streaming multiprocessor is able to execute concurrently, wherein the minimum number of streaming multiprocessors includes at least a first streaming multiprocessor;
assigns the tasks included in the set of tasks to the minimum number of streaming multiprocessors;
selects the first streaming multiprocessor from the two or more streaming multiprocessors to execute the first task;
schedules the first task to execute on the first streaming multiprocessor;
selects a second task that is associated with a second ASID from the set of tasks and associated with the first processing context; and
schedules the second task to execute on the first streaming multiprocessor, wherein scheduling the second task occurs prior to scheduling any other task from the set of tasks to execute on a second streaming multiprocessor included in the two or more streaming multiprocessors.

18. The computing device of claim 17, wherein, to select the first streaming multiprocessor, the subsystem further identifies that the first streaming multiprocessor has previously been assigned a task associated with the first processing context, which establishes that the first streaming multiprocessor has an affinity to the first processing context.

19. The computing device of claim 18, wherein selecting the first streaming multiprocessor minimizes a maximum prevailing workload for all streaming multiprocessor executing tasks associated with the first processing context.

20. A method for scheduling tasks for execution in a parallel processor comprising two or more streaming multiprocessors, the method comprising:
- receiving a set of tasks associated with a first processing context related to a first page table included in a plurality of page tables;
- selecting a first task that is associated with a first address space identifier (ASID) from the set of tasks and associated with the first processing context;
- selecting a first streaming multiprocessor from the two or more streaming multiprocessors based on the first streaming multiprocessor having an affinity to the first processing context;
- scheduling the first task to execute on the first streaming multiprocessor;
- selecting a second task that is associated with a second ASID from the set of tasks and associated with the first processing context; and
- scheduling the second task to execute on the first streaming multiprocessor prior to scheduling any other task from the set of tasks to execute on a second streaming multiprocessor included in the two or more streaming multiprocessors,
- wherein tasks associated with the first processing context are scheduled to execute on the first streaming multiprocessor until the first streaming multiprocessor can no longer accommodate any additional tasks.

21. A non-transitory computer-readable storage medium including instructions that, when executed by a processing unit, cause the processing unit to schedule tasks for execution on a first streaming multiprocessor unit, the method comprising:
- receiving a set of tasks associated with a first processing context related to a first page table included in a plurality of page tables;
- selecting a first task that is associated with a first address space identifier (ASID) from the set of tasks and associated with the first processing context;
- selecting a first streaming multiprocessor from the two or more streaming multiprocessors based on the first streaming multiprocessor having an affinity to the first processing context;
- scheduling the first task to execute on the first streaming multiprocessor;
- selecting a second task that is associated with a second ASID from the set of tasks and associated with the first processing context; and
- scheduling the second task to execute on the first streaming multiprocessor prior to scheduling any other task from the set of tasks to execute on a second streaming multiprocessor included in the two or more streaming multiprocessors,
- wherein tasks associated with the first processing context are scheduled to execute on the first streaming multiprocessor until the first streaming multiprocessor can no longer accommodate any additional tasks.

22. A computing device, comprising:
- a central processing unit that executes a process having a first processing context; and
- a parallel processing subunit coupled to the central processing unit, comprising:
  - a subsystem that includes a streaming multiprocessor that:
    - receives a set of tasks associated with a first processing context related to a first page table included in a plurality of page tables;
    - selects a first task that is associated with a first address space identifier (ASID) from the set of tasks and associated with the first processing context;
    - selects a first streaming multiprocessor from the two or more streaming multiprocessors based on the first streaming multiprocessor having an affinity to the first processing context;
    - schedules the first task to execute on the first streaming multiprocessor;
    - selects a second task that is associated with a second ASID from the set of tasks and associated with the first processing context; and
    - schedules the second task to execute on the first streaming multiprocessor prior to scheduling any other task from the set of tasks to execute on a second streaming multiprocessor included in the two or more streaming multiprocessors,
    - wherein tasks associated with the first processing context are scheduled to execute on the first streaming multiprocessor until the first streaming multiprocessor can no longer accommodate any additional tasks.

* * * * *

UNITED STATES PATENT AND TRADEMARK OFFICE
CERTIFICATE OF CORRECTION

PATENT NO. : 10,169,091 B2
APPLICATION NO. : 13/660799
DATED : January 1, 2019
INVENTOR(S) : Nick Barrow-Williams et al.

Page 1 of 1

It is certified that error appears in the above-identified patent and that said Letters Patent is hereby corrected as shown below:

In the Claims

Column 20, Claim 1, Line 24, please delete "minimum a number" and insert --minimum number--.

Signed and Sealed this
Twenty-sixth Day of March, 2019

Andrei Iancu
*Director of the United States Patent and Trademark Office*